(12) United States Patent
Ramanath

(10) Patent No.: US 7,898,706 B2
(45) Date of Patent: Mar. 1, 2011

(54) SYSTEM AND METHOD FOR MAINTAINING HUE CONSTANCY

(75) Inventor: Rajeev Ramanath, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 513 days.

(21) Appl. No.: 11/781,121

(22) Filed: Jul. 20, 2007

(65) Prior Publication Data

US 2009/0021809 A1 Jan. 22, 2009

(51) Int. Cl.
G03F 3/08 (2006.01)
G06K 9/00 (2006.01)
G09G 5/02 (2006.01)

(52) U.S. Cl. .................. 358/520; 358/523; 382/167; 345/604

(58) Field of Classification Search .................. 358/520, 358/523, 518, 504, 1.9, 530; 382/167, 162; 345/600, 604, 606, 587
See application file for complete search history.

(56) References Cited

U.S. PATENT DOCUMENTS

| 4,808,988 | A | 2/1989 | Burke et al. |
| 5,450,216 | A | 9/1995 | Kasson |
| 5,479,279 | A | 12/1995 | Barbier et al. |
| 5,568,284 | A * | 10/1996 | Oku et al. .................. 358/518 |
| 5,596,428 | A * | 1/1997 | Tytgat et al. ................ 358/518 |
| 5,696,839 | A * | 12/1997 | Siegeritz .................... 382/162 |
| 6,340,975 | B2 * | 1/2002 | Marsden et al. ............. 345/590 |
| 6,366,291 | B1 * | 4/2002 | Taniguchi et al. ........... 345/603 |
| 6,992,683 | B2 | 1/2006 | Shin et al. |
| 7,180,524 | B1 | 2/2007 | Axelrod |
| 7,737,989 | B2 * | 6/2010 | Pettitt et al. ................. 345/589 |
| 2003/0169438 | A1 * | 9/2003 | Velde et al. .................. 358/1.9 |
| 2005/0073730 | A1 * | 4/2005 | Huang et al. ................ 358/518 |
| 2006/0256214 | A1 * | 11/2006 | MacLean et al. ............ 348/234 |

* cited by examiner

*Primary Examiner*—Madeleine A Nguyen
(74) *Attorney, Agent, or Firm*—Charles A. Bill; Wade James Brady, III; Frederick J. Telecky, Jr.

(57) ABSTRACT

System and method for maintaining perceived hue constancy. A method for displaying an image includes receiving a color vector and associated image data, remapping the color vector to maintain a perceived hue constancy by adjusting a hue component of the color vector in response to a change in a lightness component or a chroma component of the color vector, providing the remapped color vector to a light source for display, and displaying image data associated with the color vector. The use of the constant hue curve ensures that the adjusting of the color vector maintains the perceived hue of the color vector, thereby helping to maintain image quality.

6 Claims, 4 Drawing Sheets

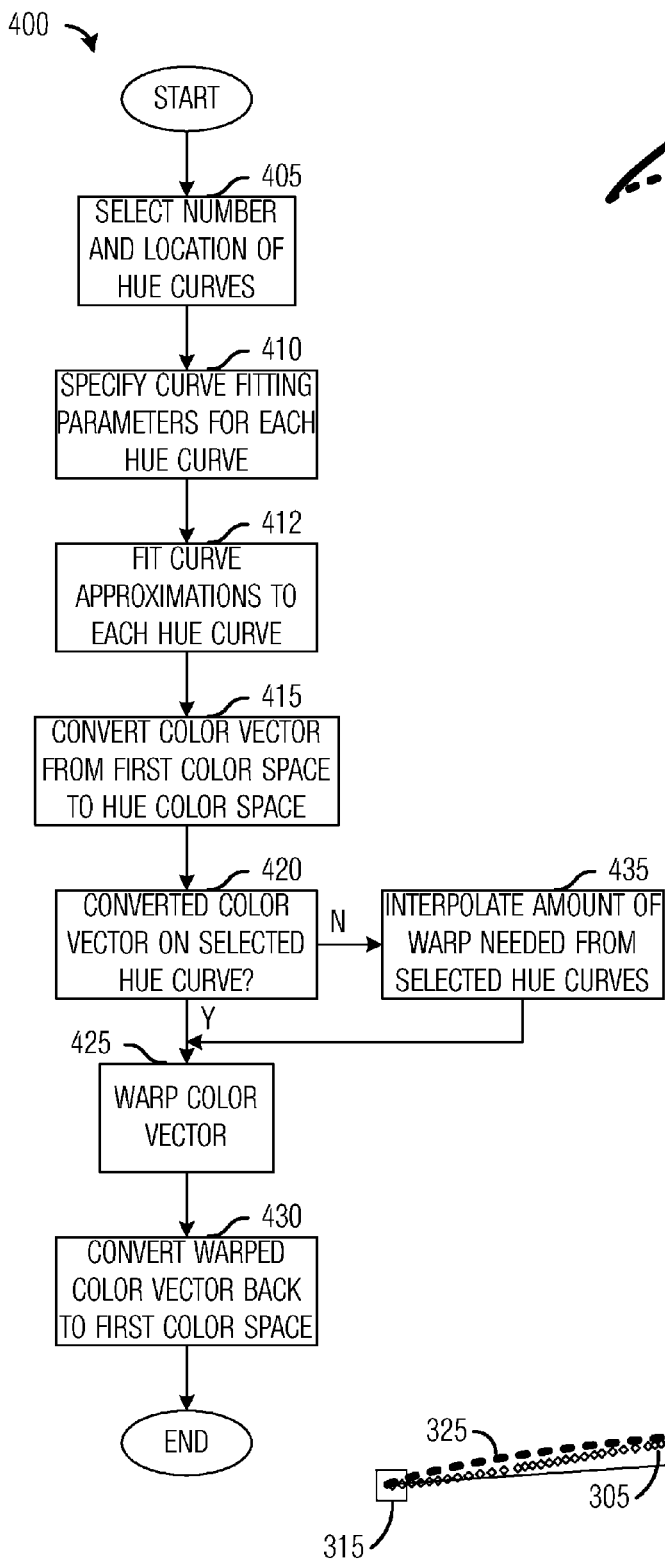
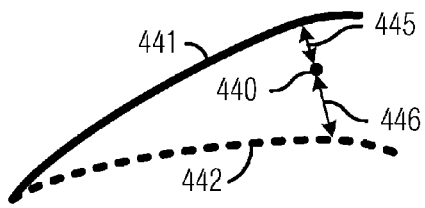
Fig. 4b
Fig. 4c
Fig. 4a
Fig. 3

but

SYSTEM AND METHOD FOR MAINTAINING HUE CONSTANCY

TECHNICAL FIELD

The present invention relates generally to a system and method for displaying images, and more particularly to a system and method for maintaining perceived hue constancy.

BACKGROUND

A color's hue may be best described as representing the color's dominant wavelength, which, for example, may be perceived by a person as red, green, blue, and so forth. To maximize the image quality of a display system, it may be important to maintain a color's hue constancy as the color's lightness (the color's luminous intensity) and/or chroma (the color's vividness) may be altered to provide brighter or dimmer images, for example. If the color's hue is allowed to change as the lightness and/or chroma are changed, there may be a shift in the color of the images. This may result in unnatural appearing images as well as constantly changing colors as image lightness and/or chroma are changed, for example.

Most modern display systems are additive in nature. One example is a digital micromirror device (DMD) based display system, wherein a large number of micromirrors arranged in an array pivot between two states (positions) to reflect colored light onto or away from a display plane. This means that as lightness and/or chroma are changed, the changes in the lightness and/or the chroma, respectively, may simply be added or subtracted from the color.

However, with the human visual system, in order to maintain a color's perceived hue constancy with changing lightness and/or chroma, the color's numerical hue may also need to be changed. The degree to which a color's numerical hue needs to be changed may depend upon the amount of lightness and/or chroma being added to the color as well as the color and, potentially, the size of the color gamut. FIG. 1a illustrates an exemplary International Commission on Illumination (CIE) xy chromaticity diagram 100. The CIE xy chromaticity diagram 100 illustrates a visible spectrum 102 with constant hue curves for several colors, such as for red (curve 105), green (curve 110), and blue (curve 115). Also shown are constant hue curves for several other colors, such as yellow (curve 120), cyan (curve 125), and magenta (curve 130).

Examining the hue curve for the color red (curve 105), for example, in order to maintain perceived hue constancy, the numerical hue increases with increasing purity until about a mid-way point of the curve 105, then the numerical hue decreases with increasing purity until the curve 105 reaches the edge of the visible spectrum 102. The degree to which a color's hue must change to maintain hue constancy may depend on the color. For example, the constant perceived hue curve for the color yellow (curve 120) remains relatively linear with changing purity.

FIG. 1b illustrates an error that may exist between the hue curve for the color red (curve 105) and a line 155 of constant numerical hue for a purely additive display system. FIG. 1b displays a zoomed view of box labeled A shown in FIG. 1a. At starting points and end points for the curve 105 and the line 155, there may be very little or no difference between the hue curve 105 for the color red and the line 155 of constant hue for the color red. However, at about a midpoint of the curve 105, there may be a significant difference between the curve 105 and the line 155 in the color red, shown as highlight 160. Also shown is a second line 165, representing a line of constant numerical hue for the color yellow in an additive display system. A difference between the constant perceived hue curve for the color yellow (curve 120) and the second line 165 (the line of constant numerical hue for the color yellow) may be small, shown as highlight 170. Thus, the difference may be more visible when images that contain more of the color red than the color yellow are displayed.

The use of modern illumination systems, such as laser, LED, and other solid-state illumination, may result in a display system with a larger color gamut. The larger color gamut resulting from these illumination systems may exacerbate the difference between an additive display system's numerical hue constancy and the human visual system's perceived hue constancy, thereby potentially degrading the image quality of images being displayed.

SUMMARY OF THE INVENTION

These and other problems are generally solved or circumvented, and technical advantages are generally achieved, by embodiments of a system and a method for maintaining perceived hue constancy.

In accordance with an embodiment, a method for maintaining a perceived hue constancy of a color vector in a display system is provided. The method includes fitting an approximation to a perceived hue curve, warping the color vector by adjusting a hue component of the color vector based on the approximation to the perceived hue curve, and providing the warped color vector to a light source for display. The method also includes displaying image data associated with the color vector.

In accordance with another embodiment, a method for displaying an image is provided. The method includes receiving a color vector and associated image data, remapping the color vector to maintain a perceived hue constancy by adjusting a hue component of the color vector in response to a change in a lightness component or a chroma component of the color vector, and providing the remapped color vector to a light source for display. The method also includes displaying image data associated with the color vector.

In accordance with another embodiment, a display system is provided. The display system includes a light source, an array of light modulators optically coupled to the light source and positioned in a light path of the light source, a video input providing a color vector, and a controller electronically coupled to the array of light modulators and to the light source. The array of light modulators produces images on a display plane by modulating light from the light source based on image data and the controller loads image data into the array of light modulators and provides commands to the light source. The controller includes a color warping unit, the color warping unit maintains perceived hue constancy by warping a hue component of the color vector with respect to a perceived hue curve.

An advantage of an embodiment is that perceived hue constancy may be maintained without altering (reducing) the color gamut of the display system. The larger color gamut implies that the display system may be able to display a wider range of colors. This may result in improved image quality, due to better color reproduction and greater colorfulness, especially with deep reds and blues.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 3 is a diagram of hue curve and an approximation to the hue curve;

FIG. 4a is a diagram of an algorithm for computing the warping of a color vector;

FIG. 4b illustrates a converted color vector and selected hue curves;

FIG. 4c illustrates an exemplary implementation of the warping of the converted color vector.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a digital micromirror device (DMD) based projection display system. The invention may also be applied, however, to other display systems, both projection and direct view, including microdisplay-based projection display systems, such as those utilizing transmissive or reflective liquid crystal displays, liquid crystal on silicon, ferroelectric liquid-crystal-on-silicon, deformable micromirrors, and so forth, and cathode ray tube projection and direct view display systems, such as liquid crystal displays, plasma displays, surface-conduction electron-emitter displays (SED), and so forth.

Figure 1A:
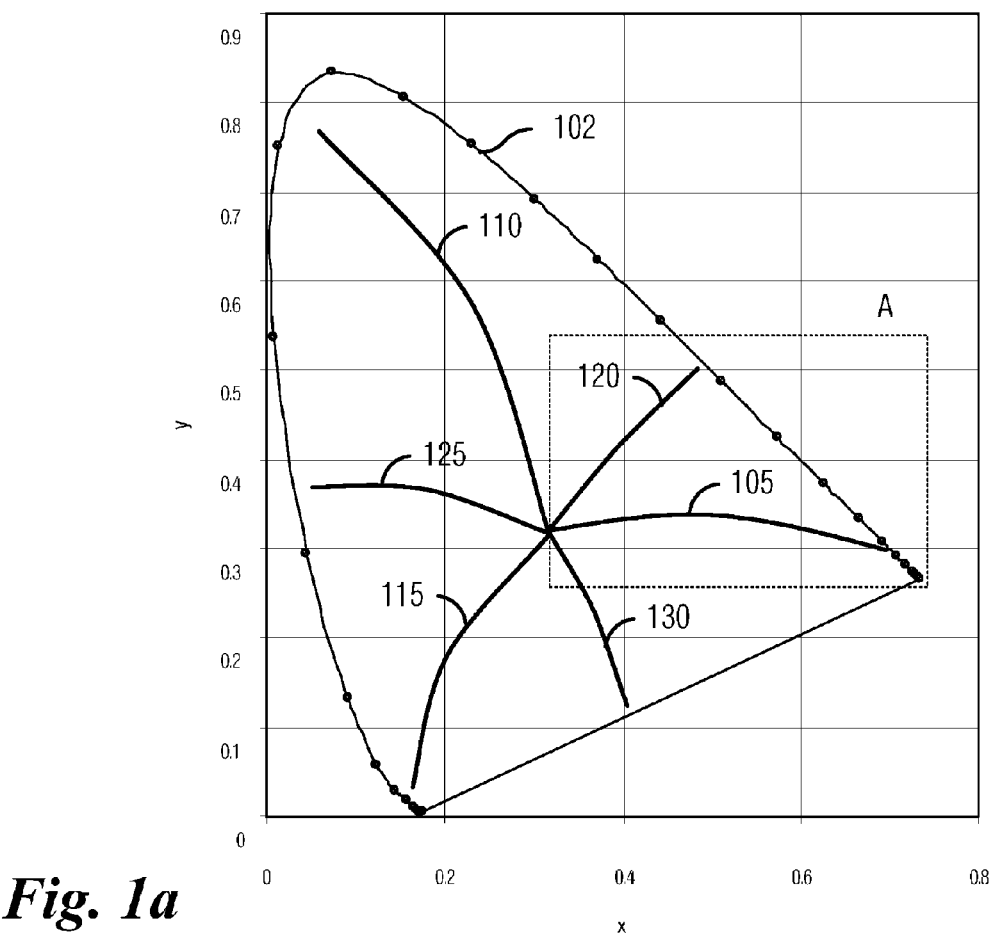
FIG. 1a is a diagram of a CIE xy chromaticity diagram.
Figure 1B:
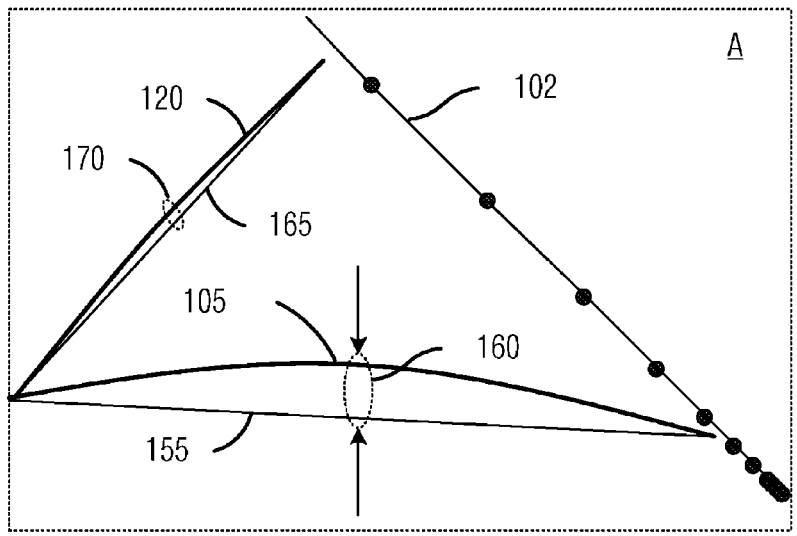
FIG. 1b is a diagram of error between a hue curve of constant perceived hue and a hue curve of constant numerical hue in an additive display system.
Figure 2A:
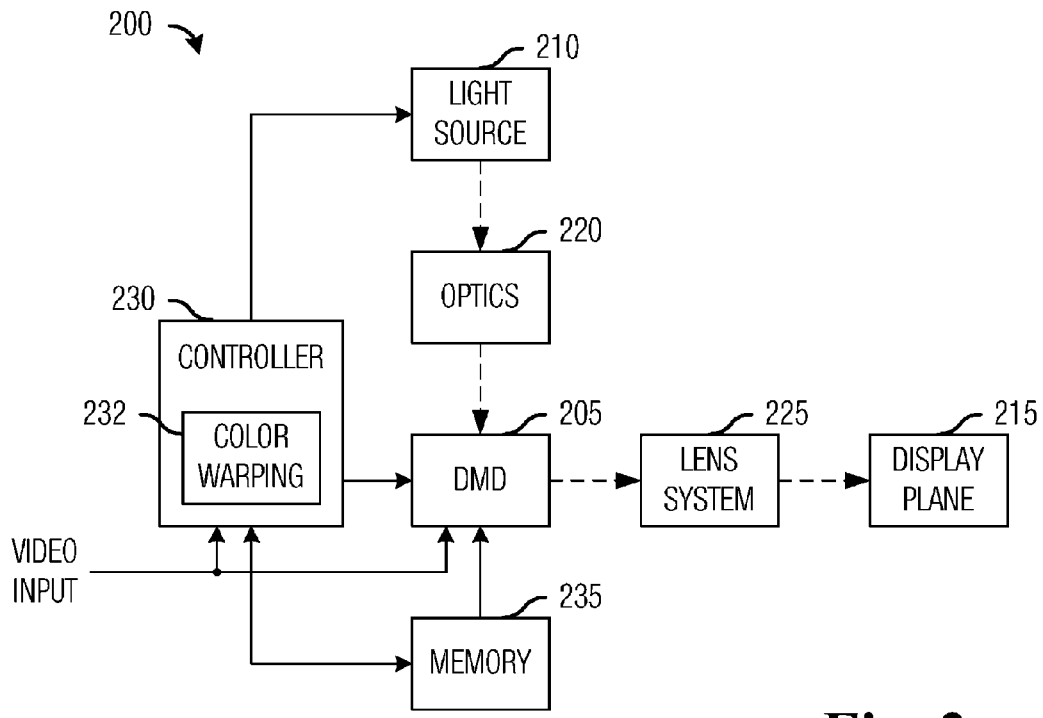
FIG. 2a is a diagram of an exemplary DMD-based projection display system.

FIG. 2a illustrates an exemplary DMD-based projection display system 200. The DMD-based projection display system 200 includes a DMD 205 that modulates light produced by a light source 210. The DMD 205 is an example of a microdisplay or an array of light modulators. Other examples of microdisplays may include transmissive or reflective liquid crystal, liquid crystal on silicon, ferroelectric liquid-crystal-on-silicon, deformable micromirrors, and so forth. In a microdisplay, a number of light modulators may be arranged in a rectangular, square, diamond shaped, and so forth, array. Each light modulator in the microdisplay may operate in conjunction with the other light modulators in the microdisplay to modulate the light produced by the light source 210. The light modulated by the DMD 205 may be used to create images on a display plane 215. The DMD-based projection display system 200 also includes an optics system 220, which may be used to collimate the light produced by the light source 210 as well as to collect stray light, and a lens system 225, which may be used to manipulate (for example, focus) the light reflecting off the DMD 205.

The DMD 205 may be coupled to a controller 230, which may be responsible for loading image data into the DMD 205, controlling the operation of the DMD 205, providing micromirror control commands to the DMD 205, controlling the light produced by the light source 210, and so forth. A memory 235, which may be coupled to the DMD 205 and the controller 230, may be used to store the image data, as well as configuration data, color correction data, and so forth.

The controller 230 may include a color warping unit 232. The color warping unit 232 may be used to alter a color vector so that a hue color component of the color vector may remain visually constant while other components of the color vector change. The changes to the other components of the color vector may be used to improve image quality. For example, an image may be lightened or darkened to help increase the contrast ratio. Although the image may be lightened or darkened, it may be desired that the perceived hue(s) of the image remain constant. For example, in a hue-saturation-lightness (HSL) color space, the color warping unit 232 may alter the color vector to change the numerical hue component value to maintain perceived hue constancy, while either the saturation component or the brightness component (or both) of the color vector is changed. In general, the color warping unit 232 may operate on color vectors in a color space wherein there is a hue color component. Examples of such color spaces may include hue-saturation-value (HSV), CIE lightness-chroma-hue (CIElch), and so forth.

Figure 2B:
FIG. 2b is a diagram of a detailed view of a color warping unit.

FIG. 2b illustrates a detailed view of the color warping unit 232. The color warping unit 232 includes a first color space converter 255, which may be used to convert a color vector to be warped from a first color space into a color space with a hue color component. For example, the first color space converter 255 may convert a color vector in the RGB color space into a color vector in the CIElch color space. The first color space converter 255 may be omitted if the color vector is already in a color space with a hue color component. The converted color vector may then be provided to a warp hue unit 260 for warping.

The warping of the converted color vector may be analogous to a remapping of the converted color vector from its original hue color component value to a new hue color component value so that the warped color vector will appear to have maintained constant hue. The warping of the converted color vector may begin with a selection of a hue curve that corresponds to the hue of the converted color vector being warped. However, since there may be a very large number of unique hue curves, it may not be practical to utilize every possible hue curve in the selection of the hue curve. Therefore, a limited number of hue curves may be used and for hues that do not correspond to a hue curve, interpolation techniques may be used to obtain a warping for the hues without corresponding hue curves. For example, hue curves for primary colors (red, green, and blue) and multiprimary colors (cyan, yellow, and magenta) may be used, for a total of six hue curves. A converted color vector with a hue that does not correspond to one of the six hue curves may be warped with one of the six curves by selecting one of the six curves closest in hue to the converted color vector to be warped and using interpolation techniques, and then the converted color vector may be warped using the selected hue curve.

To simplify the mathematics involved with the warping, an approximation of a hue curve may be created. A hue curve may be approximated using the end points of the hue curve and a point on the hue curve that is at about the mid-way point of the hue curve. A parabola may then be fitted to the hue curve utilizing these three points. FIG. 3 illustrates a hue curve 305 along with its two end points, a first end point 310 and a second end point 315. Also shown is a mid-way point 320. A parabola 325 may be fitted to these three points, resulting in a good fit to the hue curve 305. A straight line 330 may represents constant numerical hue curve passing through the first end point 310 and the second end point 315. The parabola 325 may be a closer approximation of the hue curve 305 than the line 330. As an alternative to the use of a parabola or a straight line, polynomials of different orders, as well as a piece-wise linear, piece-wise polynomial, piece-wise splines, and so forth, approximation may also be used.

The parabola 325 may be fitted to the three points (the first end point 310, the second end point 315, and the mid-way point 320) by solving the following equation:

$$\begin{vmatrix} C^2 & C & h' & 1 \\ C_0^2 & C_0 & h_0 & 1 \\ C_1^2 & C_1 & h_1 & 1 \\ C_2^2 & C_2 & h_2 & 1 \end{vmatrix} = 1,$$

where C is chroma, h is hue, and data points $<C^2_N, C_N, h_N, 1>$ represent the three control points—the two end points and the mid-way point which are known coordinates. Simplifying the above equation using color space coordinate values for the three points on the hue curve, the equation may be re-expressed as $$\begin{vmatrix} C^2 & C & h' & 1 \\ 0 & 0 & h_0 & 1 \\ \left(\frac{C_{max}}{2}\right)^2 & \left(\frac{C_{max}}{2}\right) & h_{shift} & 1 \\ C_{max}^2 & C_{max} & h_0 & 1 \end{vmatrix} = 1,$$

where the second line represents an achromatic color (for example, gray) which has a numerical chroma of 0, the fourth line represents the end point that has the maximum available numerical chroma in the particular hue ($h_0$) under consideration and the third line represents the mid-way point that has half the maximum numerical chroma. Expansion of this determinant results in a linear equation in h which gives the new value of the numerical hue for the given color. Solving the above equation yields a set of color space coordinate values of the warped color vector.

After alterations made by the warp hue unit 260, the converted and warped color vector may be converted back into its original color space by a second color space converter 265 as shown in FIG. 2b. For example, the converted and warped color vector in the CIElch color space may be converted back into the RGB color space. The warped color vector, back in its original color space may then be used by the controller 230 to generate color sequences to be provided to the DMD 205 and the light source 210 to display an image associated with the color vector as shown in FIG. 2a.

Given adequate processing power in the controller 230, the color warping performed by the color warping unit 232 may be performed in real-time while the DMD-based projection display system 200 is operating. However, it may be possible for the color warping to be performed a priori and stored in a memory, such as the memory 235. Then, as a color vector is received by the controller 230, the controller 230 may access the memory 235 to retrieve a warped color vector. The computation of the warped color vectors may be performed during manufacture of the DMD-based projection display system 200 and stored in the memory 235. Alternatively, the computation may occur during an initial power up configuration and setup phase of the DMD-based projection display system 200 and stored in the memory 235.

Figure 2C:
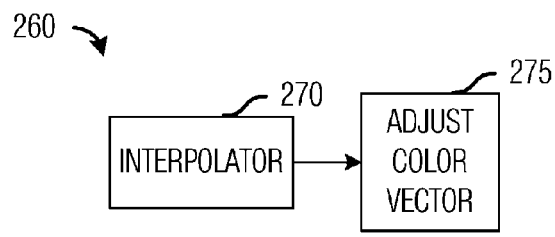
FIG. 2c is a diagram of a detailed view of a warp hue unit.

FIG. 2c illustrates a detailed view of an exemplary embodiment of the warp hue unit 260. The warp hue unit 260 includes an interpolator 270. The interpolator 270 may be used to mathematically adjust the adjusted hue color component of the converted color vector if a hue color component of converted color vector is sufficiently far away from a hue color component of selected hue curves. The interpolator 270 may help provide a hue color selection that maintains better hue constancy. The warp hue unit 260 includes an adjust color vector unit 275. The adjust color vector unit 275 may be used to adjust the color components of the converted color vector from the first color space converter 255 based on desired changes to an image. The adjustments to the color components of the converted color vector may involve adjusting the various color components of the converted color vector so that hue constancy may be maintained. The adjust color vector unit 275 may, depending on the hue component of the converted color vector, the desired change to the hue component, the hue curves, the approximation of the hue curves, and so forth, adjust all or some of the color components of the converted color vector.

With reference now to FIG. 4a, there is shown a diagram illustrating an algorithm 400 for computing the warping of a color vector. As discussed above, the algorithm 400 may execute in real-time on the controller 230 of the DMD-based projection display system 200 or a priori on some other processing element that may be used to perform the computations and then stored in the memory 235, for example.

The computation of the warping of a color vector may begin with a selection of a number and location of hue curves (block 405). The number and locations of selected hue curves may be dependent on the size of the color gamut, the available computation power that may be devoted to the computation, the size of the memory (e.g., if the computations are to be performed a priori), the quality of the accuracy of the color warping, and so on. Then, for each selected hue curve, curve fitting parameters may be specified (block 410). An example of curve fitting parameters may include a number of points on the hue curve to be used for the curve fitting. For example, if a parabola is to be used in the curve fitting, then three points may be required. If a piece-wise linear curve is to be used, then the number of points on the hue curve may be dependent on the number of linear pieces used. The computations performed in block 405 and block 410 may be reused for all subsequent warping computations, therefore, the results may be stored for later use.

After the curve fitting parameters have been selected (block 410), then the actual approximations to the selected hue curves may be computed (block 412). For example, if parabolas are used to approximate the hue curves, then a description of a parabola that may be fitted to the three points used to specify a selected hue curve may be computed by solving the $$\text{equation} \begin{vmatrix} C^2 & C & h' & 1 \\ C_0^2 & C_0 & h_0 & 1 \\ C_1^2 & C_1 & h_1 & 1 \\ C_2^2 & C_2 & h_2 & 1 \end{vmatrix} = 1, \text{ as described previously.}$$

The computation may then continue with a color space conversion, wherein the color space of the color vector being warped may be converted into a color space with a hue color component (block 415). If the color vector is already in a color space with a hue color component, then the conversion (block 415) may be unnecessary. A check may then be made to determine if the converted color vector is on one of the selected hue curve approximations (block 420). The converted color vector may not necessarily need to be exactly on one of the selected hue curve approximations, but if it is within a specified distance away from one of the selected hue curve approximations, then the converted color vector may be considered to be on one of the selected hue curve approximations.

If the converted color vector is on one of the selected hue curves, then the selected hue curve may be used along with an associated approximation, for example, a parabola fitted through three points on a curve of hue constancy associated with the selected hue curve, may be used to compute the warping of the converted color vector (block 425). If the converted color vector is not on one of the selected hue curves, then two selected hue curves that are closest to or bound the converted color vector may be selected and an interpolation may then be computed (block 435). The interpolation may be used to correct for a difference between the converted color vector and the two selected hue curves closest to the converted color vector.

The two selected hue curves may be used to compute an adjustment to their respective associated approximations. For example, if the converted color vector is about a 40% hue shift away from a first selected hue curve and about a 60% hue shift away from a second selected hue curve, then an adjustment to the converted color vector may involve the use of 40% of the associated approximation of the first selected hue curve and 60% of the associated approximation of the second selected hue curve. FIG. 4b illustrates a converted color vector 440, a first selected hue curve 441 and a second selected hue curve 442. The converted color vector 440 may be slightly closer to the first selected hue curve 441 (shown as span 445) than to the second selected hue curve 442 (shown as span 446), therefore, the approximation of the first selected hue curve 441 may be weighted more heavily in the interpolation computations. However, both approximations may be used, which may yield a better result for the particular converted color vector 440. Alternatively, a closest selected hue curve to the converted color vector may be used in the interpolation. After the interpolation correction, the interpolated converted color vector may be warped using an approximation associated with the two selected hue curves closest to the converted color vector (block 425). FIG. 4c illustrates an exemplary implementation of the warping of the converted color vector (block 425). The warping of the converted color vector may make use of a warping equation that describes an approximation to the selected hue curve(s), as described previously in the description of block 412, with or without interpolation, to adjust the hue of the converted color vector (block 450). The warping may also make use of bounds on the chroma components of the selected hue curve(s).

After the converted color vector, with or without interpolation, has been warped (block 425), the warped converted color vector may be converted back into its original color space (block 430). If the initial color space conversion (block 415) was not performed, the color space conversion (block 430) may not be necessary. If the computations are real-time, then the warped color space may now be provided to the controller 230 to compute color sequences needed to illuminate the DMD 205. If the computations are made a priori, then the warped color vector (or a representation thereof) may be stored in the memory 235 for later use. The computations performed in blocks 415 through 435 may be repeated for any remaining color vectors.

Figures 5A, 5B:
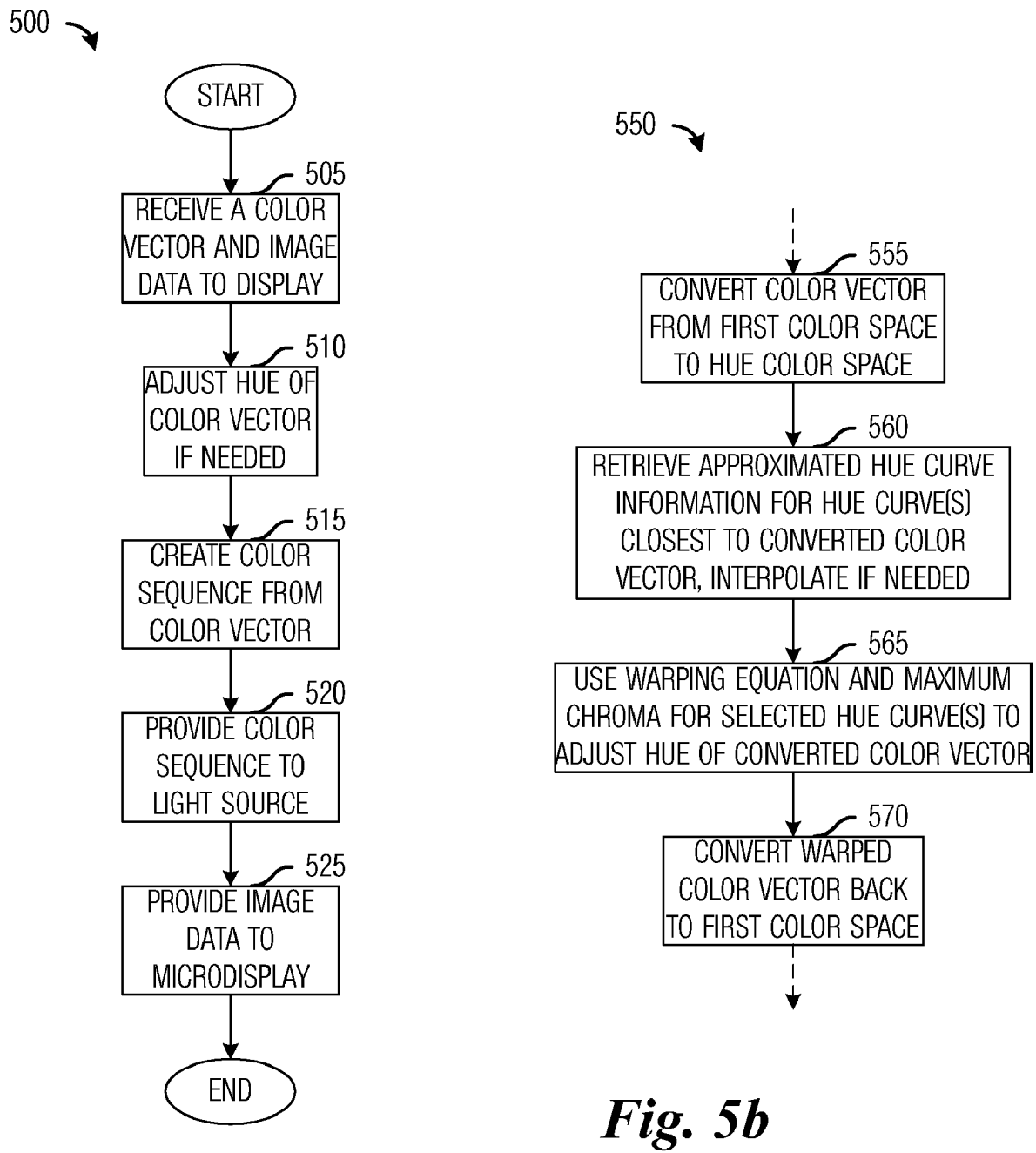
FIGS. 5a and 5b are diagrams of a sequence of events in displaying an image.

FIG. 5a illustrates a sequence of events 500 for displaying an image. The displaying of an image may begin with a display system receiving image data and color vector(s) associated with an image to be displayed (block 505). If the color vector needs to be modified, for example, to improve image quality, contrast ratio, and so forth, then the color vector may need to have its hue adjusted (block 510). The adjusting of the hue of the color vector may help to ensure that the hue of the color vector remains visually constant so that the image quality is not negatively impacted by the modification of the color vector.

The adjusting of the hue of the color vector may involve warping as described in the algorithm 400, and may involve the conversion of the color vector in to a hue color component color space, selecting a hue curve associated with a hue color component of the color vector or that has a hue color component that is closest to the hue color component of the color vector, using an approximation of the hue curve to compute a warped color vector, and converting the color vector back to the original color space.

FIG. 5b illustrates a sequence of events 550 in the adjusting of the hue of a color vector, wherein the computation of approximations of constant hue curves for a number of hues may have been performed a priori and stored in a memory. The sequence of events 550 may be an implementation of the adjusting of the hue of a color vector (block 510). After converting the color vector into a hue-component color space from a first color space (block 555), an approximation of a hue curve may be retrieved from a memory (block 560). The approximation of the hue curve may be a curve with a hue color component that is about equal to the hue color component of the converted color vector. Alternatively, the approximations of the two hue curves that may be closest to the converted color vector may be retrieved from the memory. If the converted color vector is more than a specified threshold away from any approximation of hue curves stored in memory, then interpolation may be necessary to improve the quality of the adjustments. Using the approximations of the two closest hue curves to the converted color vector, the curvature of the hue curve of the hue of the converted color vector may be approximated by blending the approximations of the two hue curves closest to the converted color vector. It may be possible to use a different number of approximations in the interpolation, wherein interpolation accuracy may be traded off for computation requirements, memory usage, and so forth. Then, using the warping equation and bounds on chroma components of the selected hue curve(s), the hue of the converted color vector may be adjusted (block 565). After adjusting, the adjusted converted color vector may then be converted from the hue-component color space back into the first color space (block 570).

With reference back to FIG. 5a, after adjusting the hue of the color vector if needed, a color sequence may be created from the color vector (block 515) and provided to a light source (block 520). The light source may produce colored light corresponding to the color sequence. While the light source is producing the colored light corresponding to the color sequence, image data may be provided to the display system, with the image data also being dependent on the color sequence (block 525).

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for maintaining a perceived hue constancy of a color vector in a display system, the method comprising:
    fitting an approximation to a perceived hue curve, wherein the fitting the approximation to the perceived hue curve comprises:
        selecting a number and location of perceived hue curves;
        specifying a set of curve fitting parameters for each perceived hue curve; and
        computing an approximation for each perceived hue curve based on a respective set of curve fitting parameters;
    warping the color vector by adjusting a hue component of the color vector based on the approximation to the perceived hue curve; and
    displaying image data associated with the color vector.

2. The method of claim 1, wherein each respective set of curve fitting parameters contains members selected from the group consisting of: type of curve, curve order, data points on the hue curve, and combinations thereof.

3. The method of claim 2, wherein a parabola is used to approximate the perceived hue curve, and wherein the data points comprise a first data point at about a first end of the perceived hue curve, a second data point at about a second end of the perceived hue curve, and a third data point at about a middle of the perceived hue curve.

4. The method of claim 3, wherein the computing comprises solving an equation expressible as:

$$\begin{vmatrix} C^2 & C & h' & 1 \\ C_0^2 & C_0 & h_0 & 1 \\ C_2^2 & C_1 & h_1 & 1 \\ C_2^2 & C_2 & h_2 & 1 \end{vmatrix} = 1,$$

where C is chroma, h is hue, and data points $<C^2_N, C_N, h_N, 1>$ represent the data points at about the first end of the hue curve, at about the second end of the hue curve, and at about the middle of the perceived hue curve, respectively.

5. The method of claim 1, comprising:
    translating the color vector into a color space having a hue component.

6. A method for maintaining a perceived hue constancy of a color vector in a display system, the method comprising:
    fitting an approximation to a perceived hue curve;
    warping the color vector by adjusting a hue component of the color vector based on the approximation to the perceived hue curve, prior to the warping, providing an approximation to an additional hue curve such that the color vector is located between the perceived hue curve and the additional hue curve, and the warping the color vector comprises interpolating between the perceived hue curve and the additional hue curve; and
    displaying image data associated with the color vector.

* * * * *